United States Patent
Carretero et al.

(10) Patent No.: US 11,401,677 B2
(45) Date of Patent: Aug. 2, 2022

(54) MINERAL WOOL EROSION CONTROL ROLL

(71) Applicants: Frank Carretero, Concord, CA (US); Zinnia Loya, Concord, CA (US)

(72) Inventors: Frank Carretero, Concord, CA (US); Zinnia Loya, Concord, CA (US)

(*) Notice: Subject to any disclaimer, the term of this patent is extended or adjusted under 35 U.S.C. 154(b) by 0 days.

(21) Appl. No.: 16/044,440

(22) Filed: Jul. 24, 2018

(65) Prior Publication Data
US 2019/0024338 A1  Jan. 24, 2019

Related U.S. Application Data

(60) Provisional application No. 62/604,829, filed on Jul. 24, 2017.

(51) Int. Cl.
 *E02B 3/12* (2006.01)
 *E02D 17/20* (2006.01)

(52) U.S. Cl.
 CPC ............ *E02D 17/202* (2013.01); *E02B 3/123* (2013.01); *E02B 3/125* (2013.01); *E02D 2200/1685* (2013.01); *E02D 2250/00* (2013.01); *E02D 2300/0053* (2013.01); *E02D 2300/0079* (2013.01)

(58) Field of Classification Search
 CPC ....................................................... E02B 3/12
 USPC ..................................................... 405/15, 16
 See application file for complete search history.

(56) References Cited

U.S. PATENT DOCUMENTS

| | | | | |
|---|---|---|---|---|
| 2,192,939 | A * | 3/1940 | Slayter | E02D 17/20 111/200 |
| 5,484,501 | A | 1/1996 | Jacobsen, Jr. et al. | |
| 5,595,458 | A * | 1/1997 | Grabhorn | E02B 3/125 405/302.6 |
| 5,830,281 | A * | 11/1998 | Kliewer | A47L 13/16 134/6 |
| 6,422,787 | B1* | 7/2002 | Mikell | E02B 3/126 405/15 |
| 6,855,650 | B1 | 2/2005 | Bohannon, Jr. | |
| 2004/0005198 | A1* | 1/2004 | Spangler | E02B 3/04 405/302.6 |
| 2007/0003369 | A1 | 1/2007 | Hanson et al. | |
| 2008/0019780 | A1* | 1/2008 | Hastings | E02D 29/0291 405/302.6 |
| 2011/0229275 | A1 | 9/2011 | Winings et al. | |
| 2017/0121922 | A1* | 5/2017 | Lipscomb | E02B 3/122 |

FOREIGN PATENT DOCUMENTS

DE    1981535 A1    4/1998

OTHER PUBLICATIONS

Web page "https://www.greenhousemegastore.com/grodan-delta-mini-block" Date unknown. 3 pages.
Web page "http://www.archiexpo.com/prod/tensar-international/product-63203-1489039.html" Date unknown. 3 pages.

\* cited by examiner

*Primary Examiner* — Sunil Singh

(57) ABSTRACT

An erosion control roll comprises a porous outer casing having an interior, a fill material within the interior, wherein the fill material comprises a mineral wool. The erosion control roll is flexible and positionable where it can provide one or more of erosion control, sediment separation, water flow diversion, and a fire barrier.

15 Claims, 2 Drawing Sheets

MINERAL WOOL EROSION CONTROL ROLL

PRIORITY

The present application claims the benefit of domestic priority based on United States Provisional Patent Application 62/604,829 filed on Jul. 24, 2017, the entirety of which is incorporated herein by reference.

BACKGROUND

In recent years, increased construction, development, and agricultural demands have heightened the need for erosion control. Erosion control is the practice of preventing or controlling wind or water erosion. Effective erosion control is important for maintaining construction sites, reducing soil and property loss, protecting wildlife habitats, and preventing water pollution.

Erosion control rolls, or wattles, have become ubiquitously used in the construction industry for erosion and sediment management. An erosion control roll is a temporary erosion control and sediment control device that is generally a roll of straw, shaved wood, or coconut fiber that is contained within a tube netting casing. Erosion control rolls can minimize erosion on a construction site. When properly used, erosion control rolls can protect water quality in nearby streams, rivers, lakes, and seas by reducing the amount of sediment erosion. Erosion control rolls can also be used in other areas. For example, erosion control rolls can be used as a silt fence along sidewalks and/or around the perimeter of construction sites to prevent sediment from flowing into gutters. Similarly, erosion rolls can be placed near drains to help reduce the amount of sediment flowing into the drain.

Though erosion control rolls have proven effective, current erosion control rolls suffer from various drawbacks. Present erosion control rolls have a high turbidity run off. In addition, the dry material used to fill present erosion controls rolls does not offer any fire resistance and breaks down over a relatively short amount of time.

Therefore, there is a need for an improved erosion control roll. The is further a need for an erosion control roll with reduced turbidity run off, with improved fire resistance, and/or with a longer use life.

SUMMARY

The present invention satisfies these needs. In one aspect of the invention, an improved erosion control roll is provided.

In another aspect of the invention, an erosion control roll produces run off with reduced turbidity.

In another aspect of the invention, an erosion control roll has improved fire resistance.

In another aspect of the invention, an erosion control roll has an increased use life.

In another aspect of the invention, an erosion control roll comprises a porous outer casing having an interior, and a fill material within the interior, wherein the fill material comprises a mineral wool, wherein the erosion control roll is flexible and positionable where it can provide one or more of erosion control, sediment separation, water flow diversion, and a fire barrier.

In another aspect of the invention, an erosion control roll comprises a porous outer casing having an interior, the outer casing having a length from about 2 feet to about 6 feet, and a fill material within the interior, wherein the fill material comprises a mineral wool, wherein the erosion control roll is flexible and positionable in or near a drain to reduce the amount of sediment entering the drain.

In another aspect of the invention, a method of making an erosion control roll comprises providing a hopper having an inlet and an outlet; supplying mineral wool granules in the hopper; attaching a first end of an outer shell to the outlet of the hopper and sealing a second end; causing the mineral wool granules to enter the first end of the outer shell and to fill the outer shell; and removing the first end of the outer shell from the hopper and sealing the first end.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to a device for use in erosion control and sediment control. In particular, the invention relates to erosion control rolls. Although the invention is illustrated and described in the context of being useful for erosion and sediment control, the present invention can be used in other ways, as would be readily apparent to those of ordinary skill in the art. Accordingly, the present invention should not be limited just to the examples and embodiments described herein.

Figure 1A:
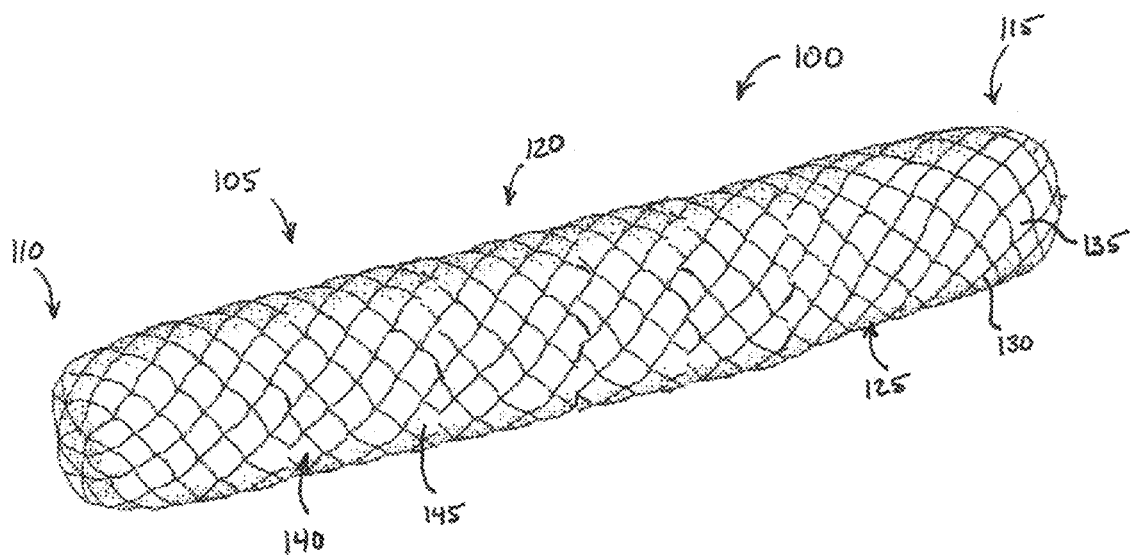
FIG. 1A is a schematic perspective view of an erosion control roll according to one version of the invention.

An erosion control roll 100 according to one version of the invention is shown in FIG. 1A. By erosion control roll it is meant any tubular or elongated roll or log having a porous outer casing containing a fill material that is useful for controlling erosion, directing the flow of water, and/or capturing sediment. Erosion control rolls are also known as wattle, erosion logs, construction site rolls or logs, and restoration rolls or logs.

The erosion control roll 100 of FIG. 1A includes an outer casing 105 having a first end 110 and a second end 115 and an elongated portion 120 connecting the first end 110 to the second end 115. The outer casing 105 is flexible and at least partially porous so that water is able to penetrate through its walls. In the version of FIG. 1A, the outer casing 105 comprises a netting 125 that is made up of woven strands 130 that create openings 135 between the strands 130. The size of the openings 135 can vary. For example, the netting 125 may have diamond shaped openings or may form a tight mesh weave. The netting 125 may be tubular or any other shape and may be made of any suitable net-like and/or weavable material, such as polyethylene, high density polyethylene, or burlap. The outer casing 105 has as interior 140 that contains a fill material 145. The fill material 145 has erosion control and/or sediment separation abilities.

The erosion control roll 100 is positioned anywhere it is desired to control erosion, reduce sediment flow, and/or otherwise manage the flow of water or soil. For example, the erosion control roll can be positioned at a construction site at a position where soil is in danger or eroding. The erosion control roll 100 assists in stabilizing construction disturbances by, for example, shortening slope lengths, reducing water flow velocities, and trapping sediment. The erosion control roll 100 can also be used as a silt fence along sidewalks and/or construction site perimeters or the like to prevent sediment from washing into gutters or run elsewhere downstream. The erosion control roll 100 can also be used in run off areas or channels to reduce water velocity and/or divert the water flow. The erosion control roll 100 can be used along the contour of a slope, typically with a slight downslope, and may be anchored with an anchor, such as a wooden or other type of stake. The erosion control roll 100 can also be used for landscaping or maintaining outdoor spaces, such as ski areas or golf courses, and for maintaining agricultural areas, such as vineyards located on sloped properties.

Figure 1B:
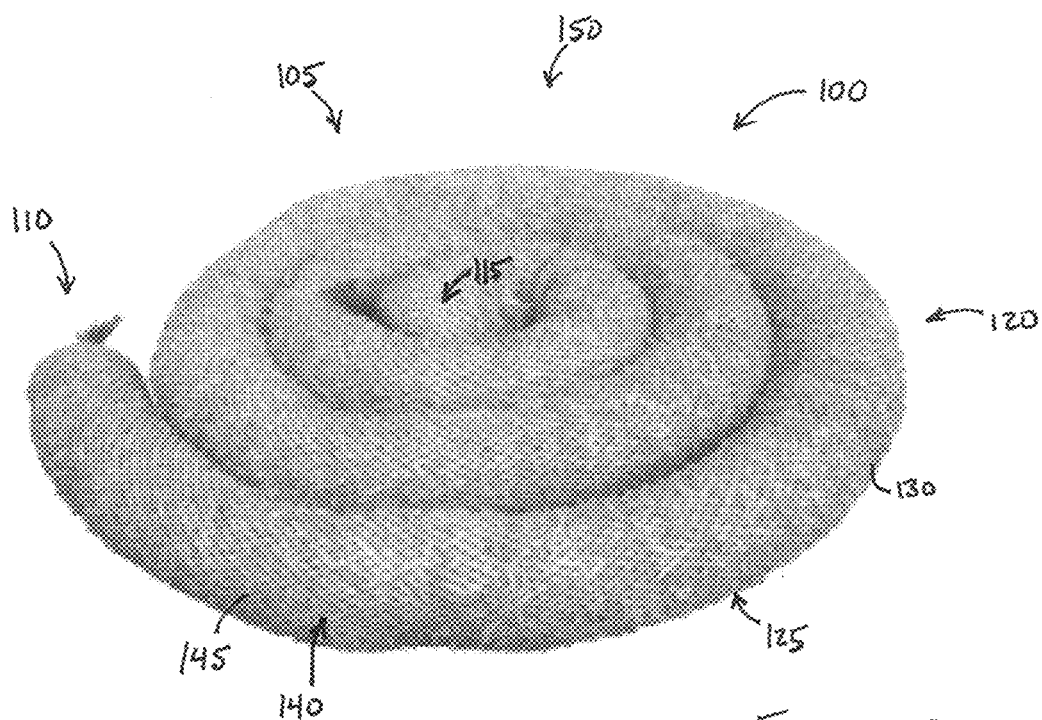
FIG. 1B is a schematic perspective view of the erosion control roll of FIG. 1A in a curled configuration.

The erosion control roll 100 may be easily contorted into various shapes. For example, the erosion control roll 100 can be sufficiently flexible, as shown in FIG. 1B to be in a coil 150 for easy storage. In use, the erosion control roll 100 can be opened up and positioned in place. The flexibility of the erosion control roll 100 allows it to be contorted to adjust to the shape of a slope, channel, or other feature. In one particular version, the erosion control roll 100 may be shapeable to be positioned around at least a portion of a drain, such as a storm drain, so that the erosion control roll 100 can separate out sediment and reduce the amount of sediment entering the drain.

In one version of the invention, the fill 145 of the erosion control roll comprises a fire resistant material, such as a mineral wool. Conventional erosion control rolls use fill 140 such as straw or wood shavings that are not fire resistant. By having a fill 145 that comprises a fire resistant material, the erosion control roll 100 can pose less of a fire hazard when in use or while being stored. By mineral wool it is meant any fibrous material formed by spinning or drawing molten minerals. Mineral wool is also known as mineral fiber, mineral cotton, mineral fibre, man-made mineral fiber, and man-made vitreous fiber. Examples of mineral wool are stone wool or rockwool, slag wool, and glass wool. In particular, stone wool is made using basalt volcanic rocks that are melted in a high temperature furnace, blown with air to create fibers that form granules. The mineral wool is noncombustible. Therefore, in a fire, the erosion control roll 100 will not contribute to a fire but will rather help serve as a fire break.

In addition, the erosion control rolls 100 having a fill that comprises mineral wool offer other advantages. For example, the erosion control rolls of the invention have improved sediment separation abilities. It has been found that the erosion control rolls 100 provide up to 99.7% filtration of silty clay run off. Also, the erosion control rolls 100 having mineral wool are longer lasting than rolls without mineral wool because the stone wool does not decompose as quickly as conventional fill materials.

In one version, the entire fill 145 is composed of mineral wool. The mineral wool can be a single type of mineral wool, such as stone wool, or can be a mixture of different types of mineral wool.

In another version, the fill can comprise a combination of mineral wool and non-mineral wood fill materials. For example, the fill 145 can comprise straw, wood shavings, coconut fiber and/or rice hulls as a primary component that is supplemented with a mineral wool. The amount of mineral wool can be selected to give a desired property, such as desired filtration ability. In another version, the fill 145 can be predominantly one or more mineral wool that is supplemented with one or more non-mineral wool materials, such as one or more of those listed above. The mineral wool can be new or used. For example, the mineral wool can be used mineral wool that was utilized in a different application and then repurposed for use in the fill 145 of an erosion control roll 100.

Figure 2A:
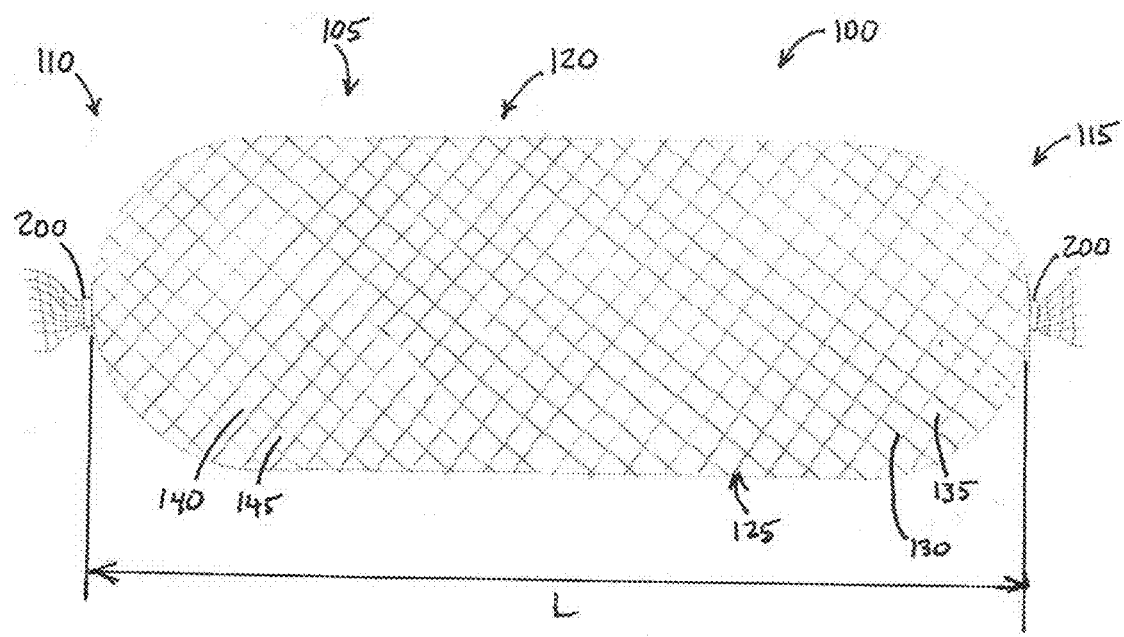
FIG. 2A is a schematic side view of an erosion control roll according to the invention.
Figure 2B:
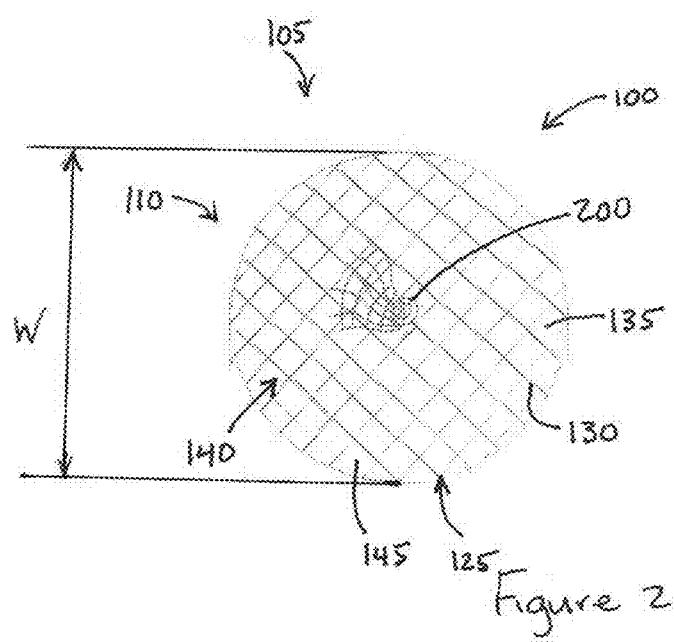
FIG. 2B is a schematic end view of the erosion control roll of FIG. 2A.

FIGS. 2A and 2B show side and end views of an example of an erosion control roll 100 of the invention. The ends 110, 115 include tie clips 200 to tie the ends of the netting 125. The fill 145 comprising the mineral wool is thus contained within the netting 125.

The dimensions of the erosion control roll 100 can be chosen to best suit a desired purpose and/or contour. For example, the length L of the erosion control roll 100 from clip 200 to clip 200 can vary. In one version, the length L is at least about 2 feet. In another version, the length is at least about 6 feet. In yet another version, the length L is from about 6 feet to about 25 feet. In this version, the erosion control roll 100 can be used in large areas for erosion control and/or sediment control. In yet another version, the length L is from about 2 feet to about 6 feet. In this version, the erosion control roll 100 can be used to cover small drains, storm drains, inlet and side drains. In like manner, the width W of the erosion control roll 100 can be selected to provide a desired shape, size, weight, filtration ability, or the like. In one version, the width W is at least about 4 inches. In another version, the width W is at least about 6 inches. In another version, the width W is from about 6 inches to about 24 inches. In another version, the width W is from about 8 inches to about 20 inches. In another version, the width W is from about 8 inches to about 12 inches.

By putting to reuse a material from a different industry that is typically thrown away into a landfill, the present invention can utilize the used mineral wool in the erosion control industry. In addition, a longer lasting erosion control roll reduces the number of rolls that need to be used over time, thus providing additional environmental value. Furthermore, the erosion control rolls 100 of the invention are naturally fire resistant, offer better filtration, have improved water retention capabilities, can be reused multiple times, and have the capability to grow native plants.

The erosion control rolls 100 of one version of the present invention can be made by the following process. A hopper is provided that has an inlet and an outlet. A supply of mineral wool, such as stone wool granules is placed in the hopper inlet. One end of the netting 125 of the outer casing 105 is placed at the hopper outlet. The mineral wool is discharged out of the hopper outlet by compaction discharge so that the outer casing is filled with the mineral wool granules into a tubular shape.

While the erosion control rolls 100 are capable of being used for erosion control and include erosion control abilities, they may be used for applications other than erosion control while remaining within the scope of the term erosion control roll. For example, the erosion control rolls 100 may be used solely for sediment separation and/or water flow diversion. In addition, the erosion control rolls 100 may be used solely as a fire break or temporary fire barrier, and in one version may be stacked on top of one another for this purpose.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

What is claimed is:

1. An erosion control roll comprising:
a porous outer casing having an interior, the porous outer casing comprising a single piece of tubular netting having a first closed end and a second closed end, and
a fill material within the interior, wherein the fill material consists essentially of mineral wool,
wherein the erosion control roll is tubular and has a length of at least about 6 feet, and wherein the erosion control roll is flexible and positionable where it can provide one or more of erosion control, sediment separation, water flow diversion, and a fire barrier.

2. An erosion control roll according to claim 1 wherein the netting comprises polyethylene, high density polyethylene, or burlap.

3. An erosion control roll according to claim 1 wherein the netting is closed at the first end and the second end by tie clips.

4. An erosion control roll according to claim 1 wherein the erosion control roll has a length of from about 6 feet to about 25 feet.

5. An erosion control roll according to claim 1 wherein the outer casing is from about 6 inches to about 24 inches in width.

6. An erosion control roll according to claim 1 wherein the outer casing is from about 8 inches to about 12 inches in width.

7. An erosion control roll according to claim 1 wherein the mineral wool comprises stone wool.

8. An erosion control roll comprising:
a porous outer casing having an interior, the porous outer casing comprising a single piece of tubular netting having a first closed end and a second closed end, the outer casing having a length from about 2 feet to about 6 feet, and
a fill material within the interior, wherein the fill material consists essentially of mineral wool,
wherein the erosion control roll is tubular having a width of from about 8 inches to about 12 inches and is flexible and positionable in or near a drain to reduce the amount of sediment entering the drain.

9. An erosion control roll comprising:
a porous outer casing having an interior, the porous outer casing comprising a single piece of tubular netting having a first closed end and a second closed end, and
a fill material within the interior, wherein the fill material consists of mineral wool,
wherein the erosion control roll is tubular and has a length of at least about 6 feet, and wherein the erosion control roll is flexible and positionable where it can provide one or more of erosion control, sediment separation, water flow diversion, and a fire barrier.

10. An erosion control roll according to claim 9 wherein the netting comprises polyethylene, high density polyethylene, or burlap.

11. An erosion control roll according to claim 9 wherein the netting is closed at the first end and the second end by tie clips.

12. An erosion control roll according to claim 9 wherein the erosion control roll has a length of from about 6 feet to about 25 feet.

13. An erosion control roll according to claim 9 wherein the outer casing is from about 6 inches to about 24 inches in width.

14. An erosion control roll according to claim 9 wherein the outer casing is from about 8 inches to about 12 inches in width.

15. An erosion control roll according to claim 9 wherein the mineral wool comprises stone wool.

* * * * *